May 11, 1965 R. L. GOLD 3,183,040
RETARDER VALVE AND SYSTEM
Filed Nov. 7, 1962

INVENTOR
ROBERT L. GOLD
BY
*Joseph E. Papin*

United States Patent Office

3,183,040
Patented May 11, 1965

---

3,183,040
RETARDER VALVE AND SYSTEM
Robert L. Gold, Pine Lawn, Mo., assignor to Wagner Electric Corporation, St. Louis, Mo., a corporation of Delaware
Filed Nov. 7, 1962, Ser. No. 236,112
5 Claims. (Cl. 303—6)

This invention relates generally to brake systems and in particular to a brake system having both retarding and service brakes and control means therefor.

In the past, the brake systems for trucks and similar heavy duty vehicles were provided with service brakes and retarding brakes each of which were adapted to be energized in response to the actuation of separate control means therefor, such as application valves. The term "service brakes" refers to conventional brakes which are employed on a vehicle for inertia stopping applications, and the term "retarding brakes" refers to brakes which are employed on a vehicle for retarding or snubbing purposes, such as to prevent the vehicle from exceeding a desired speed as on a downhill grade.

An object of the present invention is to provide an improved brake system including both service and retarding brakes and adapted to be operated in response to a singular control or actuation device.

Another object of the present invention is to provide a novel brake system in which the retarding brakes are selectively energized prior to energization of the service brakes.

Another object of the present invention is to provide a brake system having a retarder valve responsive to fluid pressure applied to the retarder brakes above a predetermined amount to meter pressure fluid to the service brakes.

Still another object of the present invention is to provide a retarder valve having metering means therein responsive to an input pressure to meter the output pressure thereof.

And still another object of the present invention is to provide a retarder valve having therein selective operable means for overcoming the metering function of said retarder valve.

Briefly, the present invention is embodied in a fluid pressure system having a first and second friction device and control means for operating one of said friction devices in response to predetermined fluid pressure conditions therein. The invention is also embodied in a retarder valve responsive to fluid pressures above a predetermined amount in the first friction device to meter fluid pressure to the second friction device, and selectively operable means for effecting unlimited fluid pressure communication between said first and second friction devices.

The invention also consists in the parts and arrangement and combination of parts hereinafter described and claimed.

Figure 1:
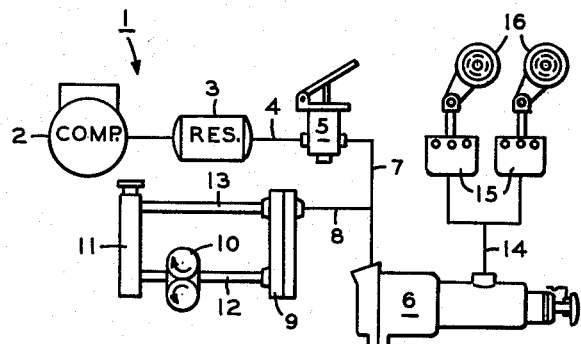
Figure 2:
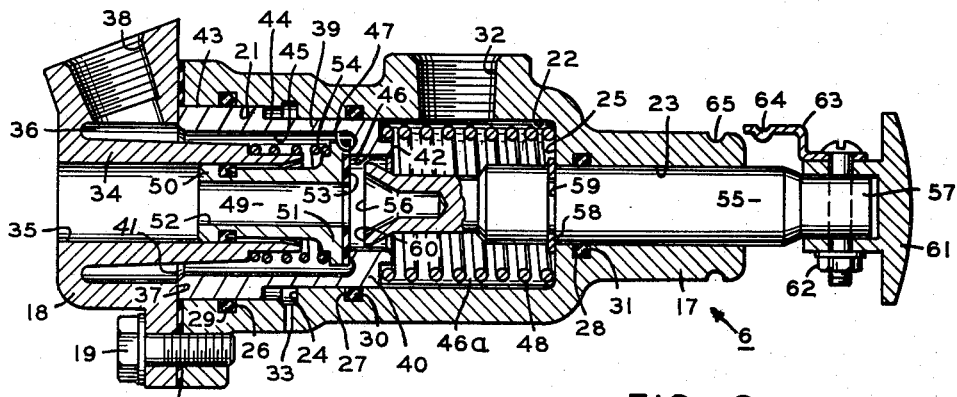
Figure 3:
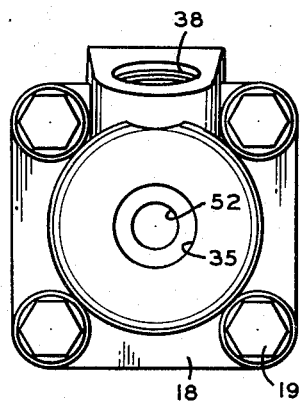

In the accompanying drawings which form a part of the specification and wherein like numerals refer to like parts wherever they occur:

FIG. 1 is a diagrammatic view of a fluid pressure system for friction devices with the retarding valve embodying the present invention shown therein, FIG. 2 is a greatly enlarged cross-sectoinal view of the retarder valve shown in FIG. 1, and FIG. 3 is a left-end view of the retarder valve shown in FIG. 2.

Referring now to FIG. 1 of the drawings, a brake system 1 is provided with pressure generating means, such as a compressor 2, which is connected through a reservoir 3 by a conduit 4 to the inlet side of actuation means, such as an application valve 5. The outlet side of the application valve 5 is connected with the inlet port of a retarder valve 6 by a conduit or service line 7, and a branch conduit 8 connects the outlet side of the application valve with a friction device or retarding brake mechanism 9. The retarding brake mechanism 9 is preferably a fluid cooled brake having an internal cooling chamber (not shown) through which cooling fluid is circulated by pumping means 10 from heat exchanger 11 through delivery and return conduits 12 and 13. To complete the system 1, another conduit 14 has one end connected with the outlet port of the retarder valve 6 while the other end thereof branches to connect with slave cylinder means, such as power cylinders 15, which operatively connect with slack adjusting means 16 of separate friction devices or service brake assemblies (not shown).

The retarder valve 6, FIGS. 2 and 3, comprises a housing 17 which is sealably connected to a closure member or housing 18 by suitable means, such as studs 19, having a gasket or seal 20 sealably interposed therebetween. The housing 17 is provided with stepped bores 21, 22, 23 extending axially therethrough, and annular shoulders 24, 25 are provided at the juncture of the housing bores 21, 22 and 22, 23, respectively. O-ring grooves 26, 27, 28 are provided adjacent the leftward end of housing bores 21, 22, 23, respectively, with O-ring seals 29, 30, 31 positioned therein. An outlet port 32 which receives the conduit 14, as previously mentioned, is provided in the housing 17 connecting with the bore 22 adjacent to the rightward end thereof, and a venting or anti-damping passage 33 connects with the bore 21 adjacent the shoulder 24.

The closure member 18 is provided with an integrally formed cylindrical extension 34 which protrudes coaxially into the housing bore 21, and a valve bore 35, which also serves as an exhaust chamber or port, extends axially through said cylindrical extension and closure member. An annular bore or inlet chamber 36 is provided in circumscribing relation with the cylindrical extension 34 connecting with the housing bore 21, and another annular shoulder 37 is provided at the juncture of said annular bore and the housing bore 21. An inlet port 38 which receives the conduit 7, as previously mentioned, is provided in the closure member 18 connecting with the annular bore 36.

A metering or control piston 39 is provided with a cylindrical body 40 having opposed free ends 41, 42 interconnected by stepped peripheral surfaces 43, 44 which are slidable in housing bores 21, 22 and sealably engaged with O-ring seals 29, 30, respectively. Stepped bores 45, 46 are axially provided through the body 40 forming an inlet passage interconnecting with free ends 41, 42, respectively, and connecting the inlet chamber 36 with an outlet chamber 46a formed in the housing bore 22 between the housing shoulder 25 and the rightward free end 42 of said piston. An annular shoulder or valve seat 47 is formed at the juncture of the piston bores 45, 46, and a metering spring 48 is interposed between the rightward free end 42 and the housing shoulder 25 having a predetermined compressive force normally biasing the piston 39 towards an inoperative or non-metering position wherein the leftward free end 41 is in abutment with the closure member shoulder 37. The effective cross-sectional area $A_1$ of the piston 39 leftward of the valve seat 47 is greater than and, of course, in opposition to the effective cross-sectional area $A_2$ thereof rightward of said valve seat.

A valve member 49 is provided with an integrally formed sleeve portion 50 slidable in the valve bore 35 and sealably engaged therewith and an enlarged sealing head 51 positioned at the free end of the extension 34, and an exhaust passage 52 is axially provided through said sleeve portion and sealing head. An annular sealing element 53 is fixedly positioned on the sealing head 51 in circumscribing relation with the exhaust passage 52, and a valve spring 54 of negligible compressive force is interposed between the closure member extension 34 and the valve sealing head 51 to normally urge the sealing element 53 into sealing engagement with the metering piston valve seat 47. The effective cross-sectional area $A_3$ of the valve sleeve 50 is less than the effective cross-sectional area $A_4$ of the metering piston valve seat 47, and therefore when the valve head 51 is engaged with said metering piston valve seat, it has an unbalanced effective area $A_5$ (equal to $A_3-A_4$) which is responsive to applied fluid pressure in the metering piston bore 45 to further engage said valve head with said metering piston valve seat, as described hereinafter.

A manually operable control member or rod 55 is slidably received in the housing bore 23 in sealable engagement with the O-ring 31 and is provided with interior and exterior free end portions 56 and 57. A split retaining ring or stop member 58 is carried in a groove 59 near the mid-portion of the control member 55, and said retaining ring is normally engaged with the housing shoulder 25 to prevent displacement of said control member from the housing bore 23. A valve seat 60 is provided on the interior free end 56 of the control member 53 in juxtaposition with the valve sealing element 53, said valve seat 60 and control member 55 having a cross-sectional area $A_6$ substantially equal to the area $A_3$ of the valve sleeve 50. A manually operated control knob 61 is removably secured to the exterior free end 57 of the control member 55 by suitable means, such as a nut and bolt assembly 62, and a positioning spring 63 has one end fixedly connected with said nut and bolt assembly and a detent 64 formed adjacent the other end thereof for releasable locking engagement with a peripheral groove 65 provided adjacent the rightward end of the housing 17.

In the operation of the system 1 and control valve 6, an operator applied force on the application valve 5 meters pressure fluid from the reservoir 3 through conduits 7 and 8 to establish a fluid pressure $P_1$ to energize the retarding brakes 9. The pressure fluid also flows through the conduit 7, the inlet port 38 of the control valve 6 and the inlet chamber 36 into the piston bore 45 to establish the fluid pressure $P_1$ therein equal to that applied to the retarding brakes 9. The fluid pressure $P_1$ acts on the effective area $A_1$ of the metering piston 39 and on the additive effective area $A_5$ of the valve sealing head 51 to create an input force $P_1(A_1+A_5)$ serving to move the metering piston 39 and valve member 49 rightwardly against the compressive force $Fs$ of the metering spring 48. If the input force $P_1(A_1+A_5)$ is less than the metering spring force $Fs$, movement of the metering piston 39 and valve member 49 is, of course, obviated, and said valve member remains engaged with the metering piston valve seat 47 preventing the passage of pressure fluid therepast to energize the service brakes.

When the fluid pressure $P_1$ acting on areas $A_1$ and $A_5$ is increased to a predetermined amount to effect an input force greater than the metering spring force $Fs$, the metering piston 39 and valve member 49 are initially concertly moved in the rightward direction to engage the sealing element 53 with the valve seat 60 on the control member free end 56 to close the valve exhaust passage 52. Subsequent rightward movement of the metering piston 39 disengages the valve seat 47 thereof from the valve head sealing element 53 to meter pressure fluid therepast from the piston bore 45 through the piston bore 46, the outlet chamber 46a, the outlet or delivery port 32 of the conduit 14 into the power cylinders 15 to establish a metered output fluid pressure $P_2$ to actuate said power cylinders and slack adjusters 16 and energize the service brakes. Since the valve sleeve area $A_3$ and control rod area $A_6$ are substantially equal, the valve member 49 is balanced upon disengagement from the piston valve seat 47 so that the input force now comprises the input fluid pressure $P_1$ acting only on the effective area $A_1$ of the piston 37. The fluid pressure $P_2$ also acts on the area $A_2$ of the piston 37 creating an output force $P_2A_2$ additive to the metering spring force $Fs$ and in opposition to the input force $P_1A_1$. Since the effective area $A_1$ of the piston 37 is greater than the opposing effective area $A_2$ thereof, the fluid pressure $P_2$ established on the smaller effective area $A_2$ provides the reaction or output force $P_2A_2$ which, when added to the metering spring force $Fs$, is equal to the input force $P_1A_1$. As a result, the fluid pressure $P_2$ developed in the output chamber 46a and in the service brakes increases in a ratio to the fluid pressure $P_1$ in the inlet chamber 36 and retarding brakes 9 that is proportional to the ratio of the effective areas $A_1$ to $A_2$. In other words, the value of the fluid pressure $P_2$ during a braking application of an intensity effecting actuation of the retarding valve 6 may be determined by the formula:

$$P_2 = \frac{A_1 P_1 - Fs}{A_2}$$

When the output force $P_2A_2$ plus the metering spring force $Fs$ becomes equal to the input force $P_1A_1$, the piston 39 is moved leftwardly to move the valve seat 47 thereon into lapped or poised position with the inlet valve sealing element 53, and said inlet valve sealing element is also moved into a lapped or poised position with the control rod seat 60. In this position, pressure fluid communication is interrupted between the outlet and inlet ports 32 and 38 and between the outlet and exhaust ports 32 and 35. If a greater braking effort is desired, the applied force on the application valve 5 is increased which effects an increase in the fluid pressure $P_1$ delivered to the retarding valve 6 and the retarding brake 9, and said retarding valve is again actuated to proportionally increase the fluid pressure $P_2$ delivered to energize the service brake, as previously described. When the applied force is removed from the application valve 5, pressure fluid is exhausted from the retarding brakes 9 and the inlet chamber 36 in the retarding valve 9 through said application valve, and the spring force $Fs$ plus the output force $P_2A_2$ moves the piston 39 to its inoperative position which allows the piston valve seat 47 to re-engage the inlet valve 49 closing communication between the inlet and outlet chambers 36 and 46a and subsequently disengage said inlet valve from the control rod valve seat 60 to open the inlet valve exhaust passage 52 exhausting pressure fluid from said outlet chamber 46a and the power cylinders 15 to release the service brakes.

In the event the operator desires to obviate the above described metering function of the control valve 6 so that the input and output pressures $P_1$ and $P_2$ for energizing the retarding and service brakes, respectively, remain substantially equal, a force is manually applied to the control knob 61 to move the control rod 55 leftwardly from its normal "out" position and sealably engage the control rod valve seat 60 with the valve member sealing element 53 closing the exhaust passage 52. Further leftward movement of said control rod 55 disengages the valve member sealing element 53 from the piston valve seat 47 and moves the detent 64 of the positioning spring 63 into locking engagement with the housing groove 65. In this manner, the locking engagement between the positioning spring detent 64 and the housing groove 65 maintains the control rod in a fixed "in" position so that the inlet valve 49 is also maintained in an open position disengaged from the piston valve seat 47. Accordingly, under such conditions, it is apparent that both the retarding and service brakes are substantially simultaneously energized in response to actuation of the application valve 5 and that the input and output pressures $P_1$ and $P_2$ are substantially equal. Further, with the control rod 55 so engaged with the valve member 49, the effective areas thereof subjected to applied fluid pressure are balanced which obviates the establishment of a force acting to disengage the positioning spring detent 64 from the housing groove 65. Of course, with the control rod 55 in the "in" position, the fluid pressure applied to energize the service brakes by the application valve 5 is also exhausted through said application valve.

When the operator again desires the metering function of the control valve 6 in the system 1, a releasing force is manually applied to the control knob 59 effecting disengagement of the positioning spring detent 64 from the housing groove 65 and moving the control rod 55 rightwardly to its normal "out" position with the snap ring 58 abutting the housing shoulder 25. When the control rod 55 is moved rightwardly toward its "out" position, the compressive force of the valve spring 54 moves the valve member 49 in following relation with said control rod and re-engages the valve member sealing element 53 with the piston valve seat 47, and further rightward movement of said control rod disengages the valve seat 60 thereon from said valve member sealing element opening the exhaust passage 52 in said valve member.

It is now apparent that a novel system and control valve therefor meeting the objects set out hereinbefore are provided and that changes or modifications to the precise configurations, shapes, or details of the construction set forth in the disclosure by way of illustration may be made by those skilled in the art without departing from the spirit of the invention as defined by the claims which follow.

What I claim is:

1. A control valve comprising inlet and outlet fluid pressure chambers, first and second valve means normally urged into sealing engagement to interrupt communication between said inlet and outlet chambers, an exhaust passage in said first valve means normally venting said outlet chamber to atmosphere, a valve seat for said first valve means in said outlet chamber, said first and second valve means being concertly movable in response to fluid pressure in said inlet chamber above a predetermined amount to sealably engage said first valve with said valve seat and close said exhaust passage, and said second valve means being further movable in response to fluid pressure in said inlet chamber to disengage said first valve means and establish metered pressure fluid communication between said inlet and outlet chambers, and resilient means having a substantially constant force to prevent concert movement of said first and second valve means until the fluid pressure in said inlet chamber attains a predetermined amount.

2. A fluid pressure control valve comprising a housing having a bore therein, inlet and outlet ports in said bore, piston means slidable in said bore, passage means in said piston for connecting said inlet and outlet ports, a first valve seat formed in said passage means, valve means including an inlet valve normally biased into sealing engagement with said first valve seat to interrupt communication between said inlet and outlet ports, an exhaust valve integrally connected with said inlet valve for simultaneous movement therewith, an exhaust passage extending through said valve means to normally establish communication between said outlet port and the atmosphere, means extending into said bore and having a second valve seat thereon, resilient means of preselected magnitude opposing movement of said piston means, said piston means and valve means being concertly movable in response to fluid pressure in said inlet port above a preselected magnitude to sealably engage said exhaust valve with said second valve seat to close said exhaust passage and interrupt communication between said outlet port and the atmosphere, said piston means being further movable to disengage said first valve seat from said inlet valve and establish metered fluid pressure communication between said inlet port and said outlet port.

3. A fluid pressure control valve comprising a housing having a pair of bores with inlet and outlet ports, piston means slidable in one of said bores, passage means in said piston means connecting with said inlet and outlet ports, valve means urged into sealing engagement with said piston means to normally close said passage means, an exhaust passage in said valve means normally venting said outlet port to atmosphere, control means reciprocally mounted in the other of said bores and having a free end in said one bore, an exhaust valve seat on the free end of said control means aligned with said valve means, spring means preventing piston and valve means movement when the fluid pressure in said inlet port is below a predetermined amount, said piston means and valve means being concertly movable in response to fluid pressure in said inlet port above said predetermined amount to engage said valve means with said exhaust valve seat to close said exhaust passage, said piston means being further movable to disengage from said valve means and establish metered pressure fluid communication between said inlet and outlet ports through said passage means, said control means being manually movable to disengage said valve means from said piston and establishing open, unmetered pressure fluid communication between said inlet and outlet ports through said passage means.

4. A control valve comprising a housing having inlet and outlet chambers therein, a piston positioned in said inlet chamber and having passage means formed therethrough between said chambers, a valve seat in said passage means, valve means disposed within said piston and normally engaging said valve seat to interrupt communication between said inlet and outlet chambers, exhaust passage means in said valve means normally venting said outlet chamber to atmosphere, precompressed spring means acting on said piston means to oppose movement of said piston and valve means toward said outlet chamber, and valve control means in said outlet chamber having a second valve seat adapted to be engaged by said valve means to interrupt communication between said outlet chamber and atmosphere and to disengage said valve means from said first valve seat to establish communication between said inlet and outlet chambers when the fluid pressure in said inlet chamber acting on said piston means exceeds the opposing force of said spring means.

5. In a retarder brake system including a source of fluid pressure, a retarder friction device and service friction device, application valve means for metering fluid pressure from said source to energize said retarder friction device, the improvement comprising control valve means including inlet and outlet chambers, said inlet chamber being connected with said application valve means to receive the metered fluid pressure therefrom and said outlet chamber being connected with said service friction device, a piston slidable in said housing between said chambers and having a passage means formed therebetween, a valve seat in said passage means, valve means disposed within said piston and normally engaging said valve seat to interrupt communication between said inlet and outlet chambers, exhaust passage means in said valve means normally venting said outlet chamber to atmosphere, said piston having fixed differential areas in said inlet and outlet chambers and actuation of said piston being opposed by spring means of substantial predetermined magnitude to thereby effect a pressure reduction in said outlet chamber when the force in the inlet chamber exceeds the opposing spring force, and valve control means in said outlet chamber having a second valve seat adapted to be engaged by said valve means upon initial piston actuation to interrupt communication between said outlet chamber and atmosphere and to disengage said valve means from said first valve seat to establish communication between said inlet and outlet chambers, said valve control means being adapted for manually displacing said valve means to disable said piston and spring means and to establish communication between said chambers to effect equal pressures therein.

References Cited by the Examiner
UNITED STATES PATENTS

| | | | |
|---|---|---|---|
| 2,362,931 | 11/44 | Rodway | 303—23 |
| 2,725,073 | 11/55 | Edge et al. | 303—7 X |
| 2,963,117 | 12/60 | McGill | 303—2 X |
| 3,006,694 | 10/61 | Valentine et al. | 303—22 A |
| 3,011,833 | 12/61 | Stelzer | 303—60 |

EUGENE G. BOTZ, *Primary Examiner.*
ARTHUR L. LA POINT, *Examiner.*